US012736379B2

(12) United States Patent
Chen et al.

(10) Patent No.: US 12,736,379 B2
(45) Date of Patent: Sep. 15, 2026

(54) METHODS FOR MEASURING TIMES-OF-FLIGHT OF ULTRASOUND ECHO SIGNALS

(71) Applicant: CHINA JILIANG UNIVERSITY, Hangzhou (CN)

(72) Inventors: Yinjie Chen, Hangzhou (CN); Weiguo Zhao, Hangzhou (CN); Keshu Qian, Hangzhou (CN); Hongli Pan, Hangzhou (CN); Cheng Xu, Hangzhou (CN)

(73) Assignee: CHINA JILIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/031,365

(22) Filed: Jan. 18, 2025

(65) Prior Publication Data

US 2025/0164300 A1 May 22, 2025

(30) Foreign Application Priority Data

Apr. 17, 2024 (CN) ......................... 202410461433.0

(51) Int. Cl.
*G01F 1/667* (2022.01)

(52) U.S. Cl.
CPC .................................... *G01F 1/667* (2013.01)

(58) Field of Classification Search
CPC ....................................................... G01F 1/667
See application file for complete search history.

(56) References Cited

U.S. PATENT DOCUMENTS 5,103,427 A * 4/1992 Erdol .................. G01S 7/52026 600/437
5,388,182 A * 2/1995 Benedetto ........... G10L 21/0208 704/211

(Continued)

FOREIGN PATENT DOCUMENTS

CN 106226407 A 12/2016
CN 106842164 A 6/2017

(Continued)

OTHER PUBLICATIONS

The Second Office Action in Chinese Application No. 202410461433.0 mailed on Jul. 22, 2025, 10 pages.

(Continued)

*Primary Examiner* — Tung S Lau
(74) *Attorney, Agent, or Firm* — PORUS IP LLC

(57) ABSTRACT

Disclosed is a method for measuring time-of-flight of an ultrasound echo signal, and relate to the field of measurement technology. The method comprising: capturing an echo signal; obtaining a reconstructed echo signal by performing denoising and reconstruction on the echo signal using an empirical wavelet transform; obtaining a preset reference echo peak value and a reconstructed echo peak value, and determining an echo characteristic peak of the reconstructed echo signal using a preset characteristic peak positioning algorithm; obtaining echo characteristic point of the echo signal; and measuring the time-of-flight of the echo signal based on the echo characteristic point using a preset measurement algorithm. Using the provided method, the time-of-flight of the ultrasound echo signal can be obtained more accurately through simple calculations.

11 Claims, 9 Drawing Sheets

(56) References Cited

U.S. PATENT DOCUMENTS

| | | | | |
|---|---|---|---|---|
| 7,867,166 | B2 * | 1/2011 | Waag | G01S 15/8977 600/443 |
| 9,934,554 | B2 * | 4/2018 | Nandi | G06T 5/70 |
| 10,249,065 | B2 * | 4/2019 | Marschner | G01R 33/5608 |
| 10,285,595 | B2 * | 5/2019 | Zalev | A61B 8/463 |
| 11,633,109 | B2 * | 4/2023 | Herzog | A61B 5/0035 600/407 |
| 2014/0204700 | A1 | 7/2014 | Valero et al. | |

FOREIGN PATENT DOCUMENTS

| | | | |
|---|---|---|---|
| CN | 109580787 | A | 4/2019 |
| CN | 113124948 | A | 7/2021 |
| CN | 116594018 | A | 8/2023 |
| EP | 3625588 | A1 | 3/2020 |

OTHER PUBLICATIONS

Decision to Grant a Patent in Chinese Application No. 202410461433.0 mailed on Aug. 20, 2025, 5 pages.

* cited by examiner

METHODS FOR MEASURING TIMES-OF-FLIGHT OF ULTRASOUND ECHO SIGNALS

CROSS-REFERENCE TO RELATED APPLICATIONS

This application claims priority to Chinese Application No. 202410461433.0, filed on Apr. 17, 2024, the entire contents of which are hereby incorporated by reference.

TECHNICAL FIELD

The present disclosure relates to the field of measurement technology, and in particular, to a method for measuring a time-of-flight of an ultrasound echo signal.

BACKGROUND

Gas ultrasonic flowmeters have the advantages of a simple structure, a high measurement accuracy, a small pressure loss, a wide range ratio, etc., and are widely used in fields such as petrochemicals, electricity, metallurgy, environmental protection, and water conservancy.

Currently, gas ultrasonic flowmeters mainly adopt a time difference technique for measurement. The measurement principle is to calculate an instantaneous flow rate by obtaining a linear velocity of a medium in a pipeline based on a difference between an upstream time-of-flight and a downstream time-of-flight of an ultrasonic wave. Therefore, the accuracy of the time-of-flight measurement determines the metering performance of the ultrasonic gas flowmeter. However, in actual working conditions, ultrasonic gas flowmeters based on the time difference technique face challenges such as a high echo noise, a low signal-to-noise ratio, an inaccurate echo feature point location, and a low time-of-flight measurement accuracy.

Currently, techniques for measuring time-of-flight mainly include a threshold technique, a cross-correlation technique, a signal fitting technique, etc. The threshold technique is widely used for time-of-flight measurement due to its advantages of low computational load, easy implementation, and simple principle. The threshold technique achieves accurate measurement of time-of-flight by locating echo feature points. However, changes in an operating condition may easily lead to inaccurate localization of the echo feature points. Adjusting the threshold to accurately locate echo feature points can improve the accuracy of time-of-flight measurement, but there are still limitations under low signal-to-noise ratio conditions.

Thus, it is desirable to provide a method for measuring a time-of-flight of an ultrasound echo signal that can perform accurate time-of-flight measurements of echo signals through simple calculations.

SUMMARY

One or more embodiments of the present disclosure provide a method for measuring a time-of-flight of an ultrasound echo signal. The method comprises: S1: capturing an echo signal; S2: obtaining a reconstructed echo signal by performing denoising and reconstruction on the echo signal using an empirical wavelet transform; S3: obtaining a preset reference echo signal, normalizing the preset reference echo signal to obtain a preset reference echo peak value, normalizing the reconstructed echo signal to obtain a reconstructed echo peak value, and determining an echo characteristic peak of the reconstructed echo signal using a preset characteristic peak positioning algorithm; S4: obtaining high-frequency sampling points corresponding to the preset reference echo signal in S3, mapping the high-frequency sampling points to a preset region corresponding to the echo characteristic peak, obtaining a data sequence corresponding to the preset region, and obtaining an echo characteristic point corresponding to the data sequence by performing calculations on the data sequence using a preset interpolation algorithm; and S5: measuring the time-of-flight of the echo signal based on the echo characteristic point using a preset measurement algorithm.

One of the embodiments of the present disclosure provides a system for measuring a time-of-flight of an ultrasound echo signal, comprising: a signal generation unit, an ultrasonic transducer unit, a transmit/receive channel switching circuit, an echo acquisition unit, a controller, a communication interface, and a remote server. The signal generation unit is configured to generate an emission parameter for transmitting an ultrasonic wave. The ultrasonic transducer unit includes a plurality of ultrasonic transducers. The transmit/receive channel switching circuit is configured to switch the plurality of ultrasonic transducers into a transmit mode or a receive mode. The controller is communicatively connected to the echo acquisition unit and the signal generation unit, and the controller is communicatively connected to the remote server via the communication interface. The controller is configured to: control each of one or more ultrasonic transducers in the transmit mode to emit an ultrasonic signal according to the emission parameter; control the echo acquisition unit to acquire an echo signal transmitted by each of one or more ultrasonic transducers in the receive mode based on a preset acquisition parameter; obtain a reconstructed echo signal by performing denoising and reconstruction on the echo signal using an empirical wavelet transform; obtain a preset reference echo signal, normalize the preset reference echo signal to obtain a preset reference echo peak value, normalize the reconstructed echo signal to obtain a reconstructed echo peak value, and determine an echo characteristic peak of the reconstructed echo signal using a preset characteristic peak positioning algorithm. The preset reference echo signal and the preset characteristic peak positioning algorithm are pre-stored in the remote server. The controller is further configured to: obtain high-frequency sampling points corresponding to the preset reference echo signal, map the high-frequency sampling points to a preset region corresponding to the echo characteristic peak, obtain a data sequence corresponding to the preset region, and obtain an echo characteristic point corresponding to the data sequence by performing calculations on the data sequence using a preset interpolation algorithm, wherein the preset interpolation algorithm is pre-stored in the remote server; and measure the time-of-flight of the echo signal based on the echo characteristic point using a preset measurement algorithm, the preset measurement algorithm being pre-stored in the remote server.

BRIEF DESCRIPTION OF THE DRAWINGS

The present disclosure is further illustrated by way of exemplary embodiments, which is described in detail by means of the accompanying drawings. These embodiments are not limiting, and in these embodiments, the same numbering denotes the same structure, wherein.

FIGS. *8a* and *8b* are exemplary schematic diagram illustrating time-of-flight measurements according to some embodiments of the present disclosure.

DETAILED DESCRIPTION

Figure 1:
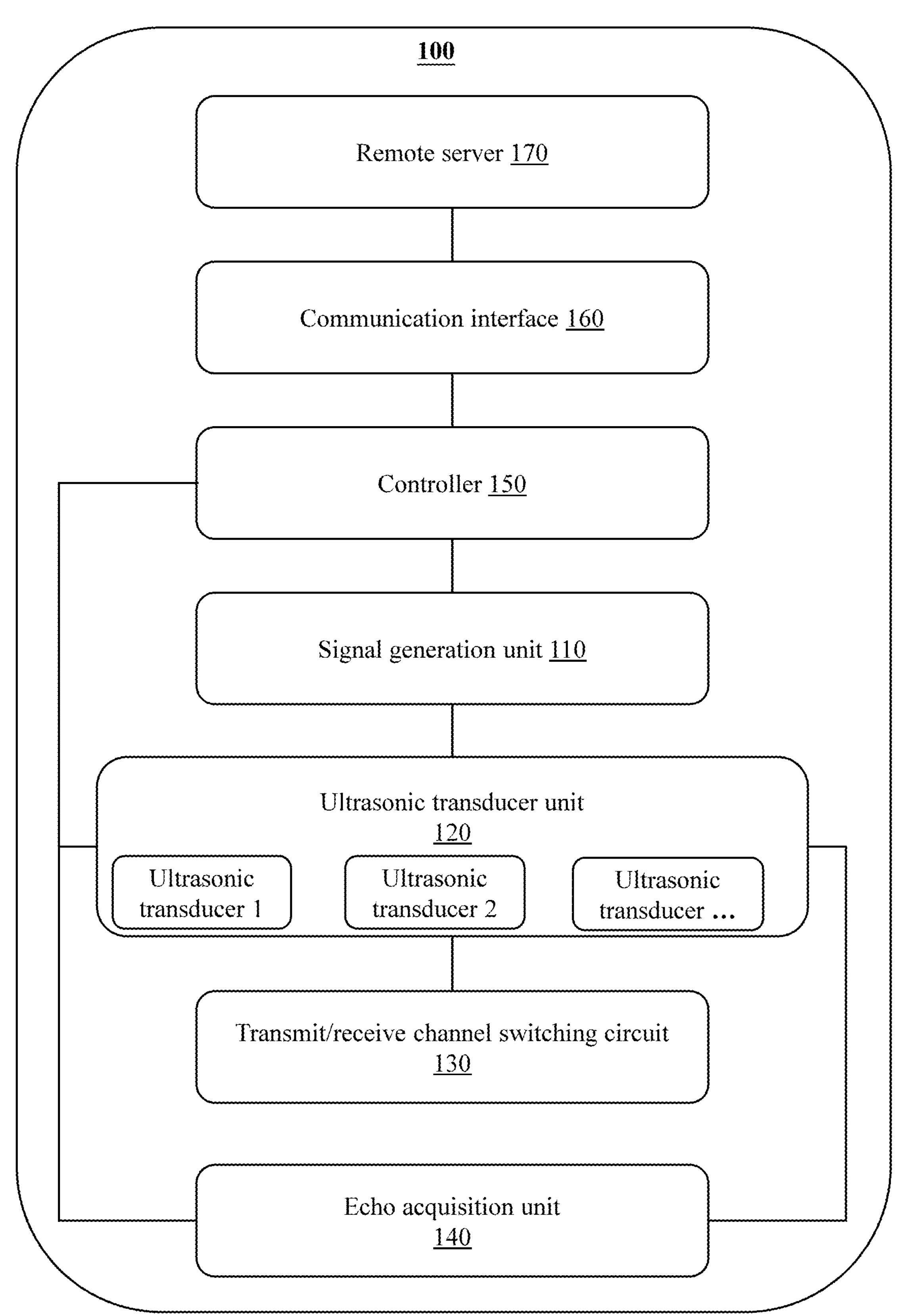
FIG. 1 is a block diagram illustrating an exemplary system for measuring a time-of-flight of an ultrasound echo signal according to some embodiments of the present disclosure.

To more clearly illustrate the technical solutions of the embodiments of the present disclosure, the following description of the accompanying drawings required to be used in the description of the embodiments are briefly described. Obviously, the accompanying drawings in the following description are only some examples or embodiments of the present disclosure, and it is possible for those skilled in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system," "device," "unit," and/or "module" are used herein as a way to distinguish between different components, elements, portions, sections, or assemblies at different levels. However, the words may be replaced by other expressions if other words accomplish the same purpose.

As shown in the present disclosure and in the claims, unless the context clearly suggests an exception, the words "one," "a," "an," and/or "the" do not refer specifically to the singular, but may also include the plural. Generally, the terms "including" and "comprising" suggest only the inclusion of clearly identified operations and elements. In general, the terms "including" and "comprising" only suggest the inclusion of explicitly identified operations and elements that do not constitute an exclusive list, and the method or device may also include other operations or elements.

Flowcharts are used in the present disclosure to illustrate operations performed by a system in accordance with embodiments of the present disclosure. It should be appreciated that the preceding or following operations are not necessarily performed in an exact sequence. Instead, operations are processed in reverse order or simultaneously. Also, it is possible to add other operations to these processes or remove a step or steps from them.

FIG. 1 In the description of the present disclosure, it should be noted that if the terms "upper", "lower", "inside", "outside", etc., indicating directions or positional relationships appear, they are based on the orientation or positional relationships shown in the accompanying drawings, or on the usual positioning when the product of the present disclosure is used. These terms are provided solely for the convenience of describing the invention and simplifying the description, and are not intended to indicate or imply that the described apparatus or components must have a specific orientation, or be constructed and operated in a specific orientation. Therefore, they should not be construed as limitations to this disclosure.

In addition, the terms "first", "second", etc., are used only for the purpose of distinguishing descriptions and are not to be construed as indicating or implying relative importance.

It should be noted that, as long as there is no conflict, the features in the embodiments of the present disclosure may be combined with each other.

FIG. 1 is a block diagram illustrating an exemplary system for measuring a time-of-flight of an ultrasound echo signal according to some embodiments of the present disclosure.

As shown in FIG. 1, a system 100 for measuring a time-of-flight of an ultrasound echo signal (also referred to as a measurement system 100) may include a signal generation unit 110, an ultrasonic transducer unit 120, a transmit/receive channel switching circuit 130, an echo acquisition unit 140, a controller 150, a communication interface 160, and a remote server 170.

The signal generation unit 110 is a unit for generating an ultrasonic wave. In some embodiments, the signal generation unit 110 may be configured to generate an emission parameter for an ultrasonic transducer to transmit an ultrasonic wave. The emission parameter may include a vibration frequency of the ultrasonic transducer, a power of the emitted ultrasonic wave, or the like. In some embodiments, the emission parameter may be preset manually.

In some embodiments, the signal generation unit 110 is a circuit that generates a corresponding electrical signal of the emitted ultrasonic wave.

The ultrasonic transducer unit 120 is a unit for transmitting or receiving an ultrasonic wave. In some embodiments, the ultrasonic transducer unit 120 may include a plurality of ultrasonic transducers. An ultrasonic transducer refers to a device that converts an electrical signal into an ultrasonic wave for emission, or converts a received ultrasonic wave into an electrical signal. In some embodiments, the ultrasonic transducer may perform the above functions by being set in different modes, where the different modes may include a transmit mode, a receive mode, or the like.

In some embodiments, when the ultrasonic transducer is in the transmit mode, the ultrasonic transducer may modulate the emitted ultrasonic wave based on the emission parameter generated by the signal generation unit 110. For example, the ultrasonic transducer may modulate a frequency of the emitted ultrasonic wave by varying a vibration frequency of the ultrasonic transducer based on the emission parameter. As another example, the ultrasonic transducer may modulate an intensity of the emitted ultrasonic wave by varying the power of the ultrasonic transducer based on the emission parameter.

The transmit/receive channel switching circuit 130 is a circuit for switching different modes of the ultrasonic transducer. For example, the transmit/receive channel switching circuit 130 may switch the plurality of ultrasonic transducers in the ultrasonic transducer unit 120 to the transmit mode or the receive mode.

The echo acquisition unit 140 is a unit for acquiring the echo signal sent by the ultrasonic transducer. In some embodiments, the echo acquisition unit 140 may be configured to acquire an echo signal transmitted by each of one or more ultrasonic transducers in the receive mode based on a preset acquisition parameter. The preset acquisition parameter refers to preset parameter for acquiring the ultrasonic wave. For example, the preset acquisition parameter may include a preset frequency of the ultrasonic wave, a preset intensity of the ultrasonic wave, or the like.

An echo signal, also referred to as an ultrasound echo signal, is a signal reflected by an object after a ultrasound wave hits the object. In some embodiments, the ultrasonic wave emitted by an ultrasonic transducer in the transmit mode are reflected by an inner wall of a pipeline or ta medium, and then received by the ultrasonic transducer in the receive mode. The ultrasonic transducer sends the received echo signal to the echo acquisition unit 140.

In some embodiments, the echo acquisition unit 140 may also include an input interface and an analog/digital converter (ADC). The analog/digital converter (ADC) is a device that converts echo information into a digital signal. In some embodiments, the echo acquisition unit 140 may receive the echo signal sent by the ultrasound converter via the input interface and send the echo signal to the controller 150 after converting the echo signal via the ADC.

The controller 150 is a device that enables interaction and control of components other than the controller or all components of the measurement system 100. In some embodiments, the controller 150 may include a field programmable gate array (FPGA), etc.

In some embodiments, the controller 150 may be communicatively connected to the echo acquisition unit 140 and the signal generation unit 110.

In some embodiments, the controller 150 may be communicatively connected to the ultrasonic transducer unit 120.

In some embodiments of the present disclosure, the controller 150 may be communicatively connected to a remote server 870 via the communication interface 160.

In some embodiments of the present disclosure, the controller 150 may be configured to: control each of one or more ultrasonic transducers in the transmit mode to emit an ultrasonic signal based on the emission parameter; control the echo acquisition unit to acquire an echo signal transmitted by each of one or more ultrasonic transducers in the receive mode based on the preset acquisition parameter; obtain a reconstructed echo signal by performing denoising and reconstruction on the echo signal using an empirical wavelet transform; obtain a preset reference echo signal, normalize the preset reference echo signal to obtain a preset reference echo peak value, normalize the reconstructed echo signal to obtain a reconstructed echo peak value, and determine an echo characteristic peak of the reconstructed echo signal using a preset characteristic peak positioning algorithm, wherein the preset reference echo signal and the preset characteristic peak positioning algorithm are pre-stored in the remote server. The controller 150 may be configured to: obtain high-frequency sampling points corresponding to the preset reference echo signal, map the high-frequency sampling points to a preset region corresponding to the echo characteristic peak, obtain a data sequence corresponding to the preset region, and obtain an echo characteristic point corresponding to the data sequence by performing calculations on the data sequence using a preset interpolation algorithm, wherein the preset interpolation algorithm is pre-stored in the remote server. The controller 150 may be configured to measure the time-of-flight of the echo signal based on the echo characteristic point using a preset measurement algorithm, the preset measurement algorithm being pre-stored in the remote server.

The communication interface 160 refers to at least one of hardware or software that connects different devices for data transfer and communication. In some embodiments of the present disclosure, the controller 150 may be communicatively connected to the remote server 870 via the communication interface 160.

The remote server 170 is a server that is configured to perform computing tasks, store data, and provide network services. In some embodiments of the present disclosure, the remote server 170 may receive the echo signal sent by the controller 150 via the communication interface 160.

In some embodiments of the present disclosure, by setting the system for measuring a time-of-flight of an ultrasound echo signal, the ultrasonic transducers can be more precisely controlled for emitting the ultrasound wave and collecting the echo signal. Additionally, by reconstructing the echo signal, a more accurate measurement of the time-of-flight of the ultrasound echo signal can be achieved.

Figure 2:
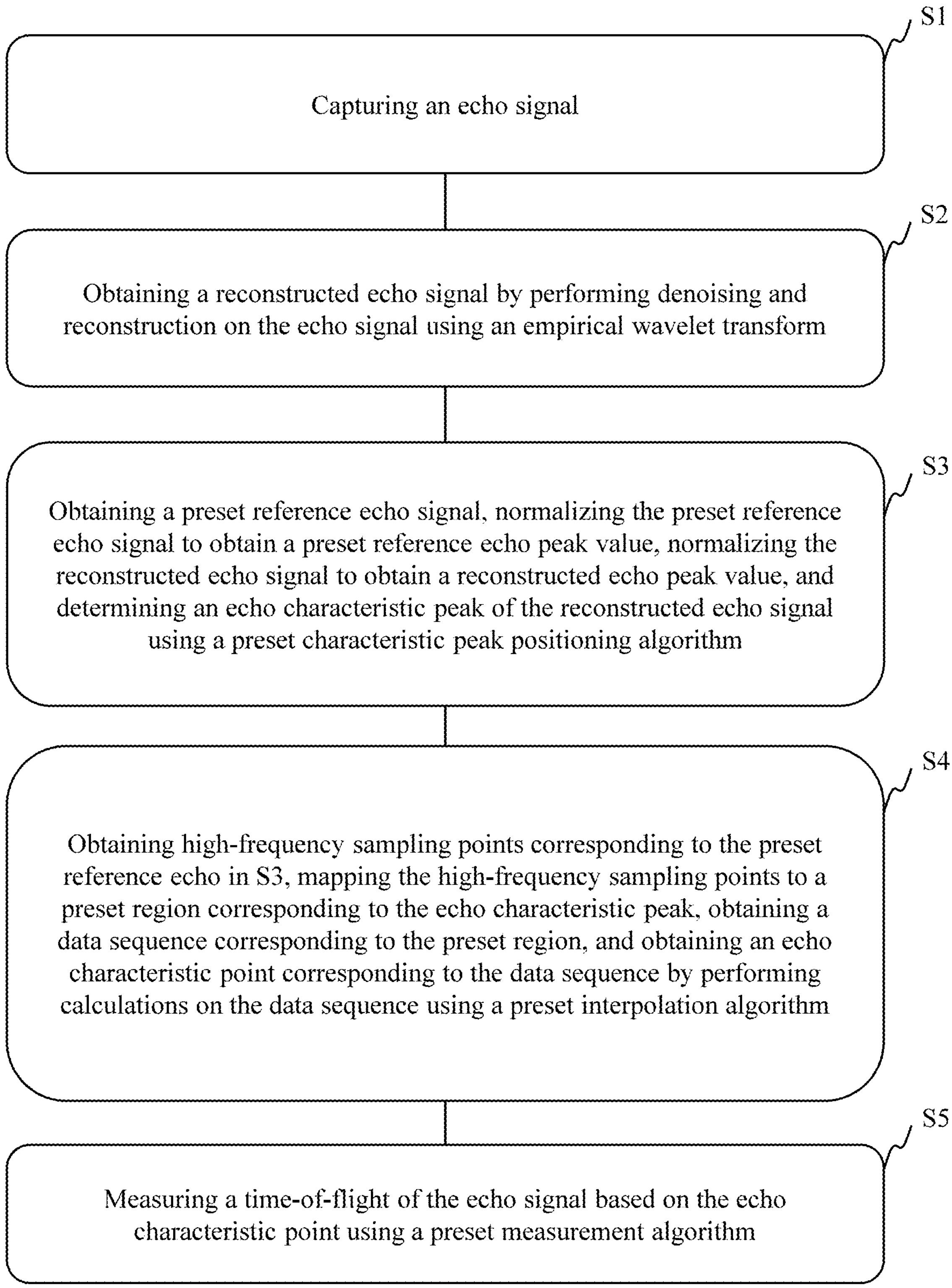
FIG. 2 is a flowchart of an exemplary process of a method for measuring a time-of-flight of an ultrasound echo signal according to some embodiments of the present disclosure.
Figure 3:
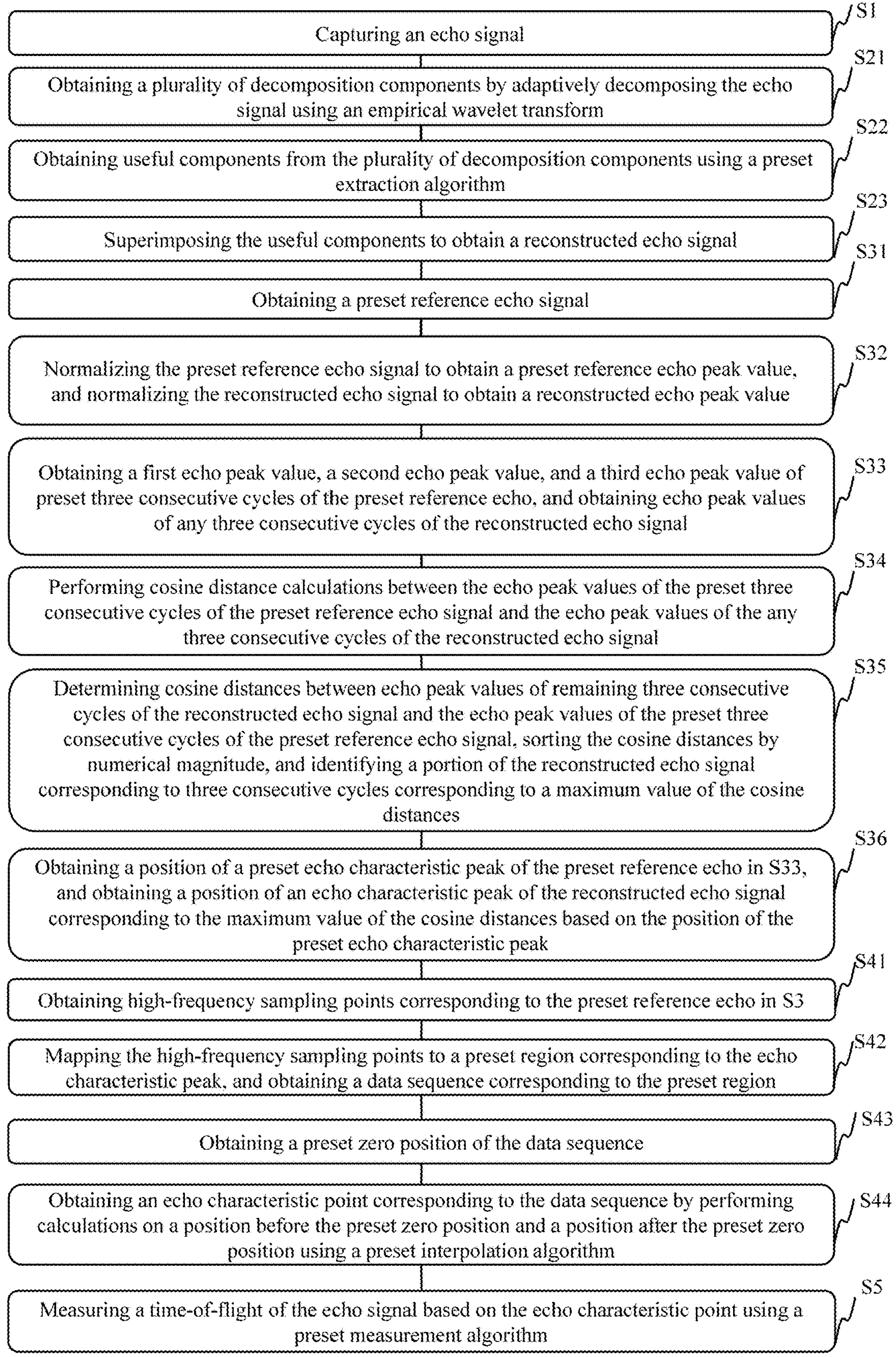
FIG. 3 is a flowchart of another exemplary process of a method for measuring a time-of-flight of an ultrasound echo signal according to some embodiments of the present disclosure.

FIG. 2 is a flowchart of an exemplary process of a method for measuring a time-of-flight of an ultrasound echo signal according to some embodiments of the present disclosure. FIG. 3 is a flowchart of another exemplary process of a method for measuring a time-of-flight of an ultrasound echo signal according to some embodiments of the present disclosure.

Referring to FIGS. 2-3, the present disclosure provides a method for measuring a time-of-flight of an ultrasound echo signal. The method may be performed by a controller, and the method may include one or more of the following operations:

S1: capturing an echo signal.

S2: obtaining a reconstructed echo signal by performing denoising and reconstruction on the echo signal using an empirical wavelet transform;

In some embodiments of the present disclosure, operation S2 may include:

S21: obtaining a plurality of decomposition components by adaptively decomposing the echo signal using the empirical wavelet transform.

S22: obtaining useful components from the plurality of decomposition components using a preset extraction algorithm.

In some embodiments, operation S22 may include:

S221: obtaining a count of maximum values and a count of preset values in the plurality of decomposition components in the operation S21, and determining boundary points.

S222: obtaining the reconstructed echo signal based on a detail coefficient $$W_f^e(n, t)$$

generated from an inner product between the empirical wavelet function $\psi_n(w)$ and the echo signal and an approximation coefficient $$W_f^e(0, t)$$

generated from an inner product between a scale function $\phi_n(\omega)$ and the echo signal.

S223: sequentially performing correlation calculations between the plurality of decomposition components and the echo signal in a preset order to determine a correlation between each of the plurality of decomposition components and the echo signal.

S224: in response to determining that the correlations between decomposition components and the echo signal are greater than a preset threshold, determining the decomposition components corresponding to the correlations as the useful components.

S23: superimposing the useful components to obtain the reconstructed echo signal.

Figure 4:
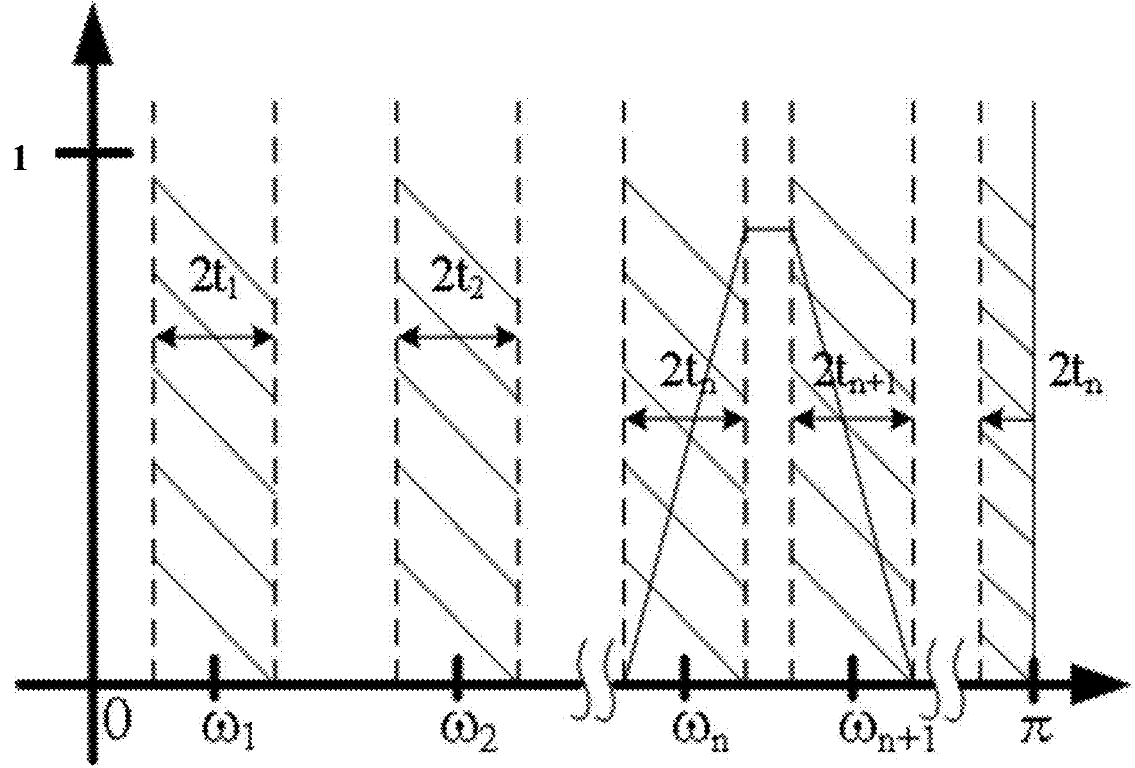
FIG. 4 is an exemplary schematic diagram illustrating Fourier spectrum segmentation according to some embodiments of the present disclosure.

FIG. 4 is an exemplary schematic diagram illustrating Fourier spectrum segmentation according to some embodiments of the present disclosure.

Referring to FIGS. 3 and 4, a Fourier transform and normalization is performed on the collected echo signal f(t) to obtain a Fourier spectrum in a range of [0, π]. Local maximum values in the spectrum are identified and arranged in descending order. A magnitude relationship between a count of the identified maximum values M and a count N of preset values of the plurality of decomposition components. If M N, it indicates that the count of the identified maximum values is enough, which may provide a basis for spectrum segmentation. In this case, the first N−1 maximum values may be retained. If M<N, it indicates that the count of preset values of the plurality of decomposition components is too large. In this case, the count of the maximum values may be retained and the count of preset values of the plurality of decomposition components may be adjust. Boundary points $\omega_n$ of the Fourier spectrum may be defined based on angular frequencies corresponding to the N maximum values. Midpoints of adjacent angular frequencies may be determined as the boundary points $\omega_n$ of the Fourier spectrum. In some embodiments, the count of preset values may be determined through a boundary point estimation model, more descriptions of which may be found in the relevant description below.

At this point, the echo signal is decomposed into N consecutive intervals, denoted as $\Lambda_n=[\omega_{n-1}, \omega_n]$, n=1, 2, 3 . . . , N, wherein $\omega_n$ denotes the boundary points between the intervals, $\omega_0=0$, $\omega_n=\pi$. A transition interval, denoted as $t_n=\gamma\omega_n (0<\gamma<1)$, with a width of $2t_n$ centered at $\omega_n$ may be defined, wherein $$\gamma < \min_n\left(\frac{\omega_{n+1}-\omega_n}{\omega_{n+1}+\omega_n}\right).$$

A signal segmentation result is shown in FIG. 4.

An empirical wavelet function $\psi_n(\omega)$ and a scale function $\phi_n(\omega)$ are constructed based on the concepts of Littlewood-Paley-Meyer wavelets, represented by the following equations (1) and (2), respectively:

$$\psi_n(\omega) = \begin{cases} 1, \omega_n + t_n \le |\omega| \le \omega_{n+1} - t_{n+1} \\ \cos\left[\frac{\pi}{2}\beta\left(\frac{1}{2t_{n+1}}(|\omega| - \omega_{n+1} + t_{n+1})\right)\right], \\ \omega_{n+1} - t_{n+1} \le |\omega| \le \omega_{n+1} + t_{n+1} \\ \sin\left[\frac{\pi}{2}\beta\left(\frac{1}{2t_{n+1}}(|\omega| - \omega_n + t_n)\right)\right], \\ \omega_n - t_n \le |\omega| \le \omega_n + t_n \\ 0, \text{other} \end{cases} \tag{1}$$

-continued $$\phi_n(\omega) = \begin{cases} 1, |\omega| \le \omega_n - t_n \\ \cos\left[\frac{\pi}{2}\beta\left(\frac{1}{2t_{n+1}}(|\omega| - \omega_{n+1} + t_{n+1})\right)\right], \\ \omega_n - t_n \le |\omega| \le \omega_n + t_n \\ 0, \text{other} \end{cases} \tag{2}$$

A detail coefficient $$W_f^e(n, t)$$

may be generated from an inner product between the empirical wavelet function $\psi_n(\omega)$ and the echo signal using Equation (3), and an approximation coefficient $$W_f^e(0, t)$$

may be generated from an inner product between the scale function $\phi_n(\omega)$ and the echo signal using Equation (4):

$$W_f^e(n, t) = \langle f, \psi_n \rangle = \int f(\tau)\overline{\psi_n(\tau - t)}d\tau = F^{-1}\left[\int f(\omega)\overline{\psi_n(\omega)}\right] \tag{3}$$

$$W_f^e(0, t) = \langle f, \phi_1 \rangle = \int f(\tau)\overline{\phi_1(\tau - t)}d\tau = F^{-1}\left[\int f(\omega)\overline{\phi_1(\omega)}\right] \tag{4}$$

In the above equations, $\overline{\psi_n(\omega)}$ and $\overline{\phi_1(\omega)}$ denote complex conjugates of $\psi_n(\omega)$ and $\phi_n(\omega)$, respectively, and $F^{-1}[*]$ denotes an inverse Fourier transform.

The reconstructed echo signal S(t) after the empirical wavelet transform may be represented by Equation (5):

$$S(t) = \sum_{k=0}^{N-1} X_k(t) \tag{5}$$

In Equation (5), $X_k(t)$ denotes an AM-FM component, which may be represented by Equation (6):

$$X_k(t) = \begin{cases} W_f^e(0, t) * \phi_1(t), k = 0 \\ W_f^e(k, t) * \phi_k(t), k = 1, 2, \ldots, N-1 \end{cases} \tag{6}$$

A correlation between each of the N AM-FM components and the echo signal is calculated sequentially, and a correlation coefficient is used to represent the correlation between the AM-FM component and the echo signal, as represented by Equation (7):

$$\rho_{X_k Y} = \frac{\text{cov}(X_k, Y)}{\sigma_{X_k}\sigma_Y} = \frac{E(X_k - u_{X_k})(Y - u_Y)}{\sigma_{X_k}\sigma_Y} \tag{7}$$

In Equation (7), $X_k$ denotes a $k^{th}$ AM-FM component, Y denotes the original echo signal f(t), and $\rho_{X_k Y}$ denotes the correlation coefficient between $X_k$ and Y. cov($X_k$, Y) denotes a product of covariances between $X_k$ and Y, and $\sigma_{X_k}\sigma_Y$ denotes a product of standard deviations of $X_k$ and Y.

A preset threshold E is established. If $\rho_{X_k Y}>\varepsilon$, the component is considered a useful component. All useful components $X_k(t)$ are summed to obtain the reconstructed echo signal S(t), wherein k denotes a serial number of the useful component, as detailed in Equation (5) earlier.

In some embodiments, the operation S221 further includes: determining the count of the preset values via a boundary point prediction model based on the count of the maximum values, a frequency of the echo signal, and a signal-to-noise ratio of the echo signal.

The boundary point prediction model refers to a model for determining the count of the preset values. In some embodiments, the boundary point prediction model may be a machine learning model. For example, the boundary point prediction model may be a Neural Network (NN) model, a Deep Neural Network (DNN) model, or the like, or any combination thereof. In some embodiments, an input of the boundary point prediction model includes the count of the maximum values, the frequency of the echo signal, and the signal-to-noise ratio of the echo signal, and an output of the boundary point prediction model includes the count of the preset values.

In some embodiments, the boundary point prediction model may be obtained through training based on a large number of labeled training samples. For example, the controller may obtain a training dataset, the training dataset comprising training samples and labels corresponding to each of the training samples. The controller may perform one or more rounds of iterations, wherein a round of iteration may include: selecting one or more training samples from the training dataset; inputting the one or more training samples into an initial boundary point prediction model, and obtaining a model prediction output corresponding to the one or more training samples; substituting the model prediction output and one or more labels corresponding to the one or more training samples into a predefined loss function, and calculating a value of the loss function; and performing reverse updating on a model parameter of the initial boundary point prediction model based the value of the loss function using a gradient descent technique, or the like. When the iteration satisfies a preset condition, the iteration is ended and a trained boundary point prediction model is obtained. The preset condition may include the loss function converging, a count of the iterations reaching a threshold, or the like.

In some embodiments, the training sample may include a count of sample maximum values measured multiple times in historical data, and a frequency and a signal-to-noise ratio of a sample echo signal. The training label may include a count of preset values corresponding to the training sample. The training label may be the count of preset values when a difference between a calculated time-of-flight and an actual time-of-flight of the sample echo signal is minimized during multiple measurements in the historical data corresponding to training sample. The actual time-of-flight may be obtained based on the sample echo signal and a preset linear velocity of a medium in a pipeline to be measured. More descriptions of the medium and the pipeline to be measured may be found in related descriptions below.

In some embodiments of the present disclosure, determining the count of the preset values through the boundary point prediction model improves the rationale of the count of the preset values, reduces information loss due to an improper setting of the count of the preset values, and makes the measured time-of-flight of the echo signal more accurate.

In some embodiments, a count of training samples for each sampling type in the training samples of the boundary point prediction model is greater than a preset count threshold.

The sampling type is a classification type relating to the sample echo signal and the pipeline to be measured. In some embodiments, the controller may determine the sampling type of the training samples based on the frequency of the sample echo signal, a diameter of the pipeline to be measured, and a material characteristic of the pipeline to be measured. For example, the controller may determine the sampling type by querying a preset table based on the above factors. The preset table includes a correspondence between different sampling types and frequencies of sample echo signals, diameters of pipelines to be measured, and material characteristics of the pipelines to be measured that correspond to the different sampling types, which may be preset manually.

The material characteristic of a pipeline to be measured refers to data reflecting the material characteristic of a pipe wall of the pipeline to be measured. For example, the material characteristic of a pipeline to be measured may include a material, a roughness, a thickness, etc., of the pipe wall of the pipeline to be measured.

The preset count threshold refers to a count of echo signal samples set in advance. In some embodiments, the preset count threshold may be set according to different sampling types.

The pipeline to be measured refers to a pipeline in which a measurement system is located when measuring the time-of-flight of the ultrasound echo signal. Related descriptions of the measurement system may be found in the corresponding descriptions of FIG. 1. In some embodiments, the pipeline to be measured includes at least one medium. The medium may be different types of gases, such as fuel gas, oxygen, carbon dioxide, or the like.

In some embodiments, the preset count threshold correlates to a count of types of media in the pipeline to be measured. For example, the preset count threshold may be positively correlated to the count of types of media in the pipeline to be measured.

In some embodiments of the present disclosure, echo signals are classified and collected by sampling types, and it is ensured that the count of echo signals for each sampling type is greater than the preset count threshold. This ensures the applicability of the boundary point prediction model to echo signals of different sampling types, thereby ensuring the accuracy of the boundary point prediction model. When the count of types of media in the pipeline to be measured is relatively large, the preset count threshold may be increased to ensure that the boundary prediction model has sufficient training samples, thus ensuring the training effect of the boundary prediction model.

In some embodiments, operation S224 further includes: determining the preset threshold based on environmental data of the pipeline to be measured, compositional data of the medium in the pipeline to be measured, and the frequency of the echo signal.

The environmental data refers to data reflecting an environment within the pipeline to be measured. In some embodiments, the environmental data of the pipeline to be measured may include a temperature and a pressure within the pipeline to be measured.

The compositional data of the medium refers to data reflecting the compositional components of the medium in the pipeline to be measured, which may include, various components of the medium and proportions thereof.

In some embodiments, the controller may determine the preset threshold in multiple ways based on the environmental data of the pipeline to be measured, compositional data of the medium within the pipeline to be measured, and the frequency of the echo signal. For example, the controller may construct a plurality of clustering vectors based on environmental data of historical pipelines to be measured, compositional data of media in the historical pipelines to be measured, and frequencies of historical echo signals in historical data, and designating corresponding historical preset threshold as labels corresponding to the clustering vectors. The controller may construct a target vector based on the environmental data of a current pipeline to be measured, the composition data of the medium in the current pipeline to be measured, and the frequency of the current echo signal, cluster the plurality of clustering vectors and the target vectors, obtain a plurality of clusters, and set a label corresponding to a clustering vector containing the target vector that has a highest similarity between a subsequently reconstructed echo signal and a preset reference echo signal as the preset threshold corresponding to the target vector. The similarity may include a cosine similarity, or the like.

In some embodiments of the present disclosure, by determining the preset threshold based on the environmental data of the pipeline to be measured, the compositional data of the medium in the pipeline to be measured, and the frequency of the echo signal using techniques such as cluster analysis, a reasonable preset threshold can be determined according to actual conditions, ensuring that the subsequently obtained reconstructed echo signal is more accurate.

- S3: obtaining a preset reference echo signal, normalizing the preset reference echo signal to obtain a preset reference echo peak value, normalizing the reconstructed echo signal to obtain a reconstructed echo peak value, and determining an echo characteristic peak of the reconstructed echo signal using a preset characteristic peak positioning algorithm.

In some embodiments, operation S3 may include:

- S31: obtaining the preset reference echo signal.
- S32: normalizing the preset reference echo signal to obtain the preset reference echo peak value, and normalizing the reconstructed echo signal to obtain the reconstructed echo peak value.
- S33: obtaining a first echo peak value, a second echo peak value, and a third echo peak value of preset three consecutive cycles of the preset reference echo signal, and obtaining echo peak values of any three consecutive cycles of the reconstructed echo signal.
- S34: performing cosine distance calculations between the echo peak values of the preset three consecutive cycles of the preset reference echo signal and the echo peak values of the any three consecutive cycles of the reconstructed echo signal.
- S35: determining cosine distances between echo peak values of remaining three consecutive cycles of the reconstructed echo signal and the echo peak values of the preset three consecutive cycles of the preset reference echo signal, sorting the cosine distances by numerical magnitude, and identifying a portion of the reconstructed echo signal corresponding to three consecutive cycles corresponding to a maximum value of the cosine distances.
- S36: obtaining a position of a preset echo characteristic peak of the preset reference echo signal in S33, and obtaining a position of an echo characteristic peak of the reconstructed echo signal corresponding to the maximum value of the cosine distances based on the position of the preset echo characteristic peak.

Figure 5:
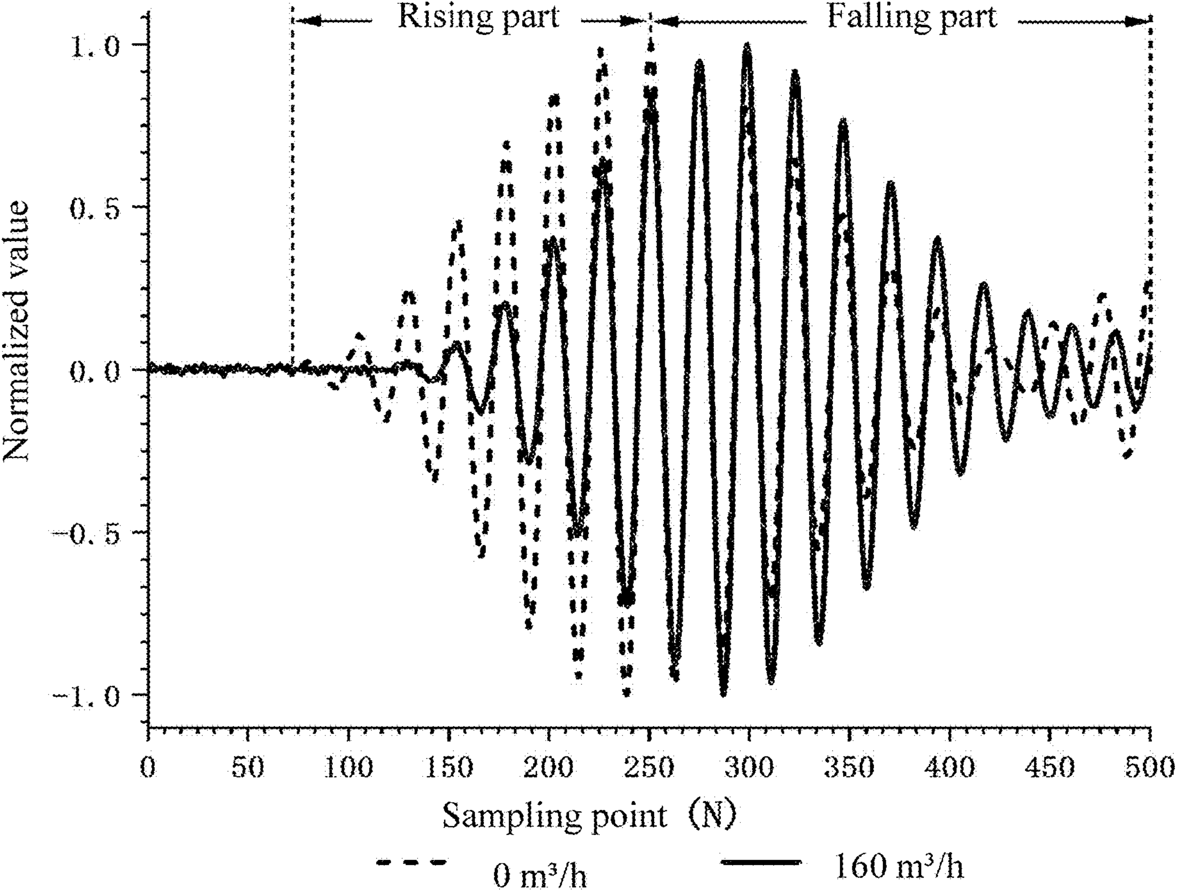
FIG. 5 is an exemplary schematic diagram illustrating normalized echo signals under different flow rates according to some embodiments of the present disclosure.

FIG. 5 is an exemplary schematic diagram illustrating normalized echo signals under different flow rates according to some embodiments of the present disclosure.

Referring to FIG. 5, an echo signal is generally divided into two parts, a rising part and a falling part, and waveforms of the rising parts of the normalized echo signals under different flow rates exhibit a high similarity. The similarity of characteristic peaks of the waveforms are determined based on cosine distances, thereby locating an echo characteristic point in the rising part of the echo signal.

The pre-stored preset reference echo signal is normalized using Equation (8):

$$y_n = \frac{V_n - V_{ref}}{V_{max} - V_{ref}} \tag{8}$$

In Eq. (8), $y_n$ denotes a normalized value corresponding to an $n^{th}$ sampling point, $V_n$ denotes a voltage of the $n^{th}$ sampling point of the preset reference echo signal, $V_{ref}$ denotes a DC bias voltage of the preset reference echo signal, and $V_{max}$ denotes a maximum peak voltage of the preset reference echo signal.

Figure 6:
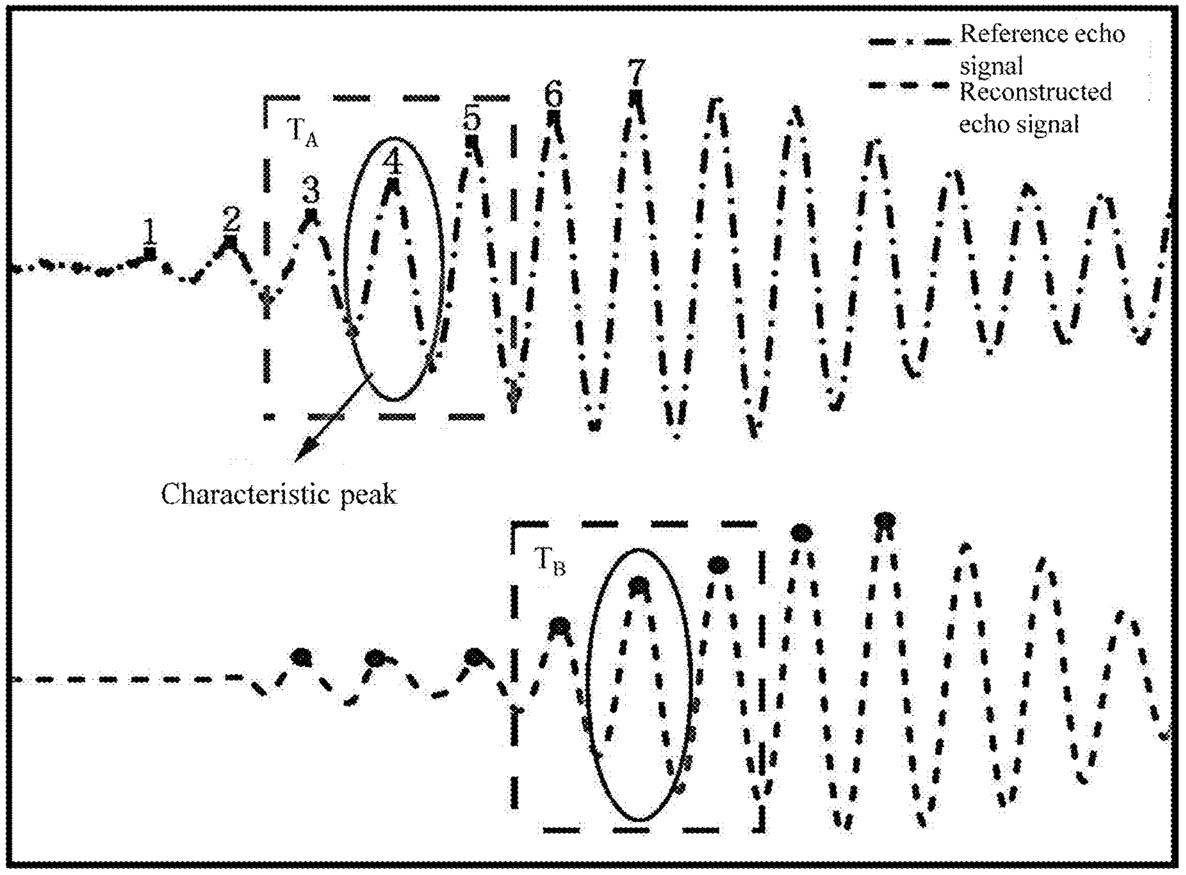
FIG. 6 is an exemplary schematic diagram illustrating the determination of an echo characteristic peak according to some embodiments of the present disclosure.

FIG. 6 is an exemplary schematic diagram illustrating the determination of an echo characteristic peak according to some embodiments of the present disclosure.

Referring to FIG. 6, select a $3^{rd}$ peak, a $4^{th}$ peak, and a $5^{th}$ peak in the preset reference echo signal are selected as a reference object $T_A$ (as shown by a portion of the reference echo signal circled by the dashed box), peaks of any three consecutive cycles of the reconstruct echo signal are designated as an evaluation object $T_B$ (as shown by a portion of the reconstructed echo circled by the dashed box), and the $4^{th}$ peak of the reference object $T_A$ is set as the echo characteristic peak. The reference object $T_A$ is maintained unchanged, different evaluation objects $T_B$ are selected, and cosine distance calculations may be performed between the selected evaluation objects $T_B$ and the reference object $T_A$ using Equation (9):

$$R(A, B) = \frac{\sum_{i=3,j=n}^{i=5,j=n+2} a_i b_j}{\sqrt{\sum_{i=3}^{5} a_i^2}\sqrt{\sum_{j=n}^{j=n+2} b_j^2}} \tag{9}$$

In Eq. (9), $A=(a_1, a_2, \ldots, a_n)$ and $B=(b_1, b_2, \ldots, b_n)$ denote vectors corresponding to the reference object $T_A$ and the evaluation object $T_B$ for similarity evaluation, $a_n$ and $b_n$ denote normalized values of peak voltages of the echo signals of the objects $T_A$ and $T_B$, respectively, and n denotes an n'h wave peak of the echo.

Based on a result of the cosine distance calculation, a group of three consecutive cycle peaks with a highest cosine distance is determined as a similar echo. The echo characteristic peak of the reconstructed echo signal under an actual working condition may be determined based on the position of the echo characteristic peak in the reference object $T_A$.

In some embodiments, the operation S33 may further include: determining an optimal cycle count based on the material characteristic of the pipeline to be measured, a distribution of electromagnetic devices, and an impurity content of the medium in the pipeline to be measured; and obtaining a plurality of echo peak values of the preset reference echo signal and a plurality of echo peak values of the reconstructed echo signal based on the optimal cycle count.

More descriptions of the material characteristic of the pipeline to be measured may be found in the corresponding description of the operation S221.

In some embodiments, a plurality of electromagnetic devices may be distributed near the pipeline to be measured. For example, various types of sensors within the pipeline, high-voltage power lines around the pipeline, or the like.

The distribution of electromagnetic devices refers to data reflecting the distribution of the plurality of electromagnetic devices around the pipeline to be measured. For example, the distribution of electromagnetic devices may include distances of the plurality of electromagnetic devices from a measurement system (e.g., the measurement system 100).

In some embodiments, the impurity content of the medium in the pipeline to be measured refers to the content of fine particulates and dust in the medium in the pipeline to be measured.

The optimal cycle count refers to a preferred count of consecutive cycles needed to obtain the echo peak value.

In some embodiments, the controller may determine the optimal cycle count in a variety of ways based on the material characteristic of the pipeline to be measured, the distribution of the electromagnetic devices, and the impurity content of the medium in the pipeline to be measured. For example, the controller may construct a feature vector based on the material characteristic of the pipeline to be measured, the distribution of the electromagnetic equipment, and the impurity content of the medium in the pipeline to be measured. The controller may match the feature vector in a vector database and determine one or more reference vectors with a similarity greater than a similarity threshold as one or more matching vectors. An average value of one or more labels corresponding to the one or more matching vectors is determined as the optimal cycle count.

The vector database includes reference vectors and labels corresponding to the reference vectors. The reference vector may be constructed based on the material characteristic of the pipeline to be measured, the distribution of the electromagnetic devices, and the impurity content of the medium in the pipeline to be measured in a historical record, and its corresponding label may be the count of cycles corresponding to a minimum average value of all cosine distances obtained according to operation S35 during multiple historical measurements corresponding to the historical record. The similarity may be determined based on a cosine distance, a Euclidean distance, or the like.

In some embodiments, the controller may acquire a plurality of echo peak sequences of the preset reference echo signal and a plurality of echo peak sequences of the reconstructed echo based on the optimal cycle count. For example, the controller may replace three consecutive cycles with K consecutive cycles according to the optimal cycle count (e.g., the optimal cycle count is K) to obtain the echo peak values of the preset reference echo signal and the echo peak values of the reconstructed echo by a manner similar to operations S33 to S35.

In some embodiments of the present disclosure, by determining the optimal cycle count based on the material characteristic of the pipeline to be measured, the distribution of the electromagnetic device, and the impurity content of the medium within the pipeline to be measured, the corresponding echo peak values of the preset reference echo signal and the echo peak values of the reconstructed echo can be obtained. This allows for the determination of the optimal cycle count that better fits the actual situations, thereby improving the accuracy of determining the echo characteristic point of subsequent reconstructed echo signal.

S4: obtaining high-frequency sampling points corresponding to the preset reference echo signal in S3, mapping the high-frequency sampling points to a preset region corresponding to the echo characteristic peak, obtaining a data sequence corresponding to the preset region, and obtaining an echo characteristic point corresponding to the data sequence by performing calculations on the data sequence using a preset interpolation algorithm.

In some embodiments, the operation S4 may include:

S41: obtaining the high-frequency sampling points corresponding to the preset reference echo signal in S3.

S42: mapping the high-frequency sampling points to the preset region corresponding to the echo characteristic peak, and obtaining the data sequence corresponding to the preset region.

S43: obtaining a preset zero position of the data sequence.

S44: obtaining the echo characteristic point corresponding to the data sequence by performing calculations on a position before the preset zero position and a position after the preset zero position using the preset interpolation algorithm.

Figure 7:
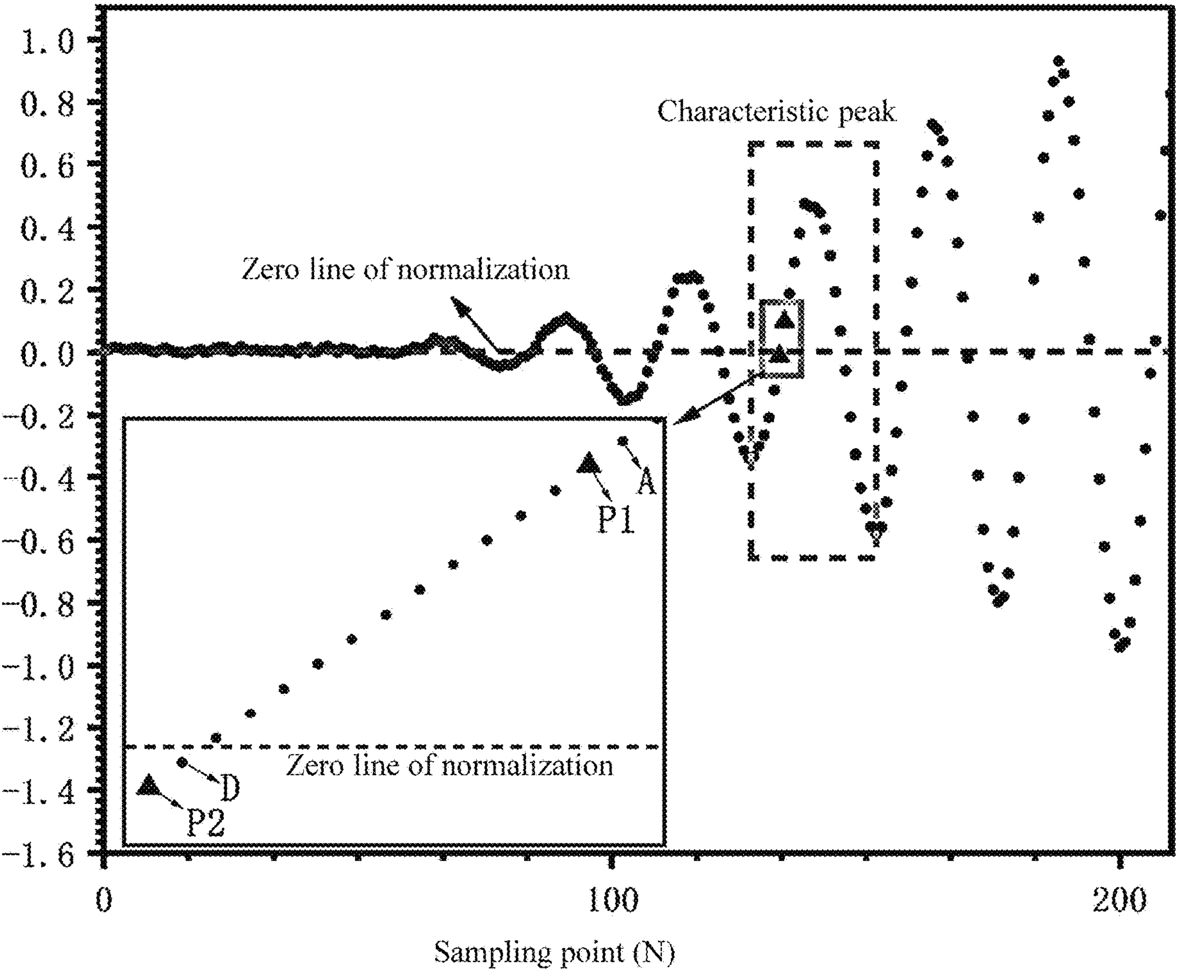
FIG. 7 is an exemplary schematic diagram illustrating the localization of an echo characteristic point according to some embodiments of the present disclosure.

FIG. 7 is an exemplary schematic diagram illustrating the localization of an echo characteristic point according to some embodiments of the present disclosure.

Referring to FIG. 7, high-frequency sampling points of the preset reference echo signal are mapped to corresponding positions of sampling points of the characteristic peak of the reconstructed echo signal, thereby obtaining a new data sequence. By searching the new data sequence, the echo characteristic point may be calculated using a preset interpolation algorithm based on data before and after a preset zero position. The preset interpolation algorithm may be preset manually. For example, the preset interpolation algorithm may include a linear interpolation technique, a cubic spline interpolation technique, or the like.

A sequence of the sampling points of the rising part of the characteristic peak of the reconstructed echo signal may be set as: $L=[l_1, l_2, \ldots, l_{m-1}, l_m, \ldots, l_n]$, wherein $l_n$ denotes a normalized value of a sampling voltage corresponding to the reconstructed echo signal. A sequence of the sampling points of the rising part of the characteristic peak of the preset reference echo signal may be set as: $H=[h_1, h_2, \ldots, h_q, \ldots, h_p, \ldots, h_i]$, wherein $h_i$ denotes a normalized value of a sampling voltage corresponding to the preset reference echo signal.

A first point greater than zero in the sequence L may be identified and designated as P1, which corresponds to $l_m$ in the sequence L. A point before the first point P1 may be designated as P2, which corresponds to $l_{m-1}$ in the sequence L. A first point A and a point D in the sequence H that are greater than the values of P1 and P2 may be identified based on the values of the two points P1 and P2, and the two points A and D correspond to $h_p$ and $h_q$ in the sequence H. The sampling points $h_p$ and $h_q$ identified from the sequence H and the high-frequency sampling points between the two sampling points $h_p$ and $h_q$ are inserted into the sequence L in order of size, forming a new non-equidistant data sequence: $Z=[l_1, \ldots, l_{m-1}, h_q, h_{q+1}, \ldots, h_{p-1}, l_m, h_p, l_{m+1}, \ldots l_n]$. By search the sequence Z, the data before and after a zero point may be identified, and interpolation calculations may be performed using the preset interpolation algorithm. The zero point obtained from this process is determined as the echo characteristic point.

S5: measuring the time-of-flight of the echo signal based on the echo characteristic point using a preset measurement algorithm.

Figure 8A:
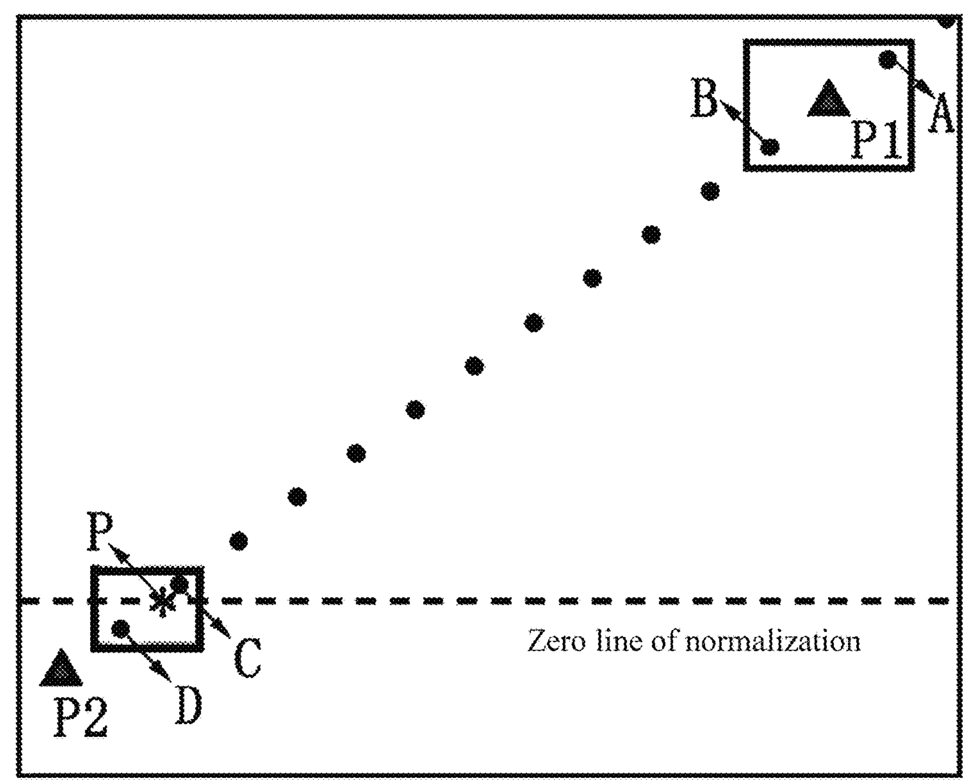
Figure 8B:
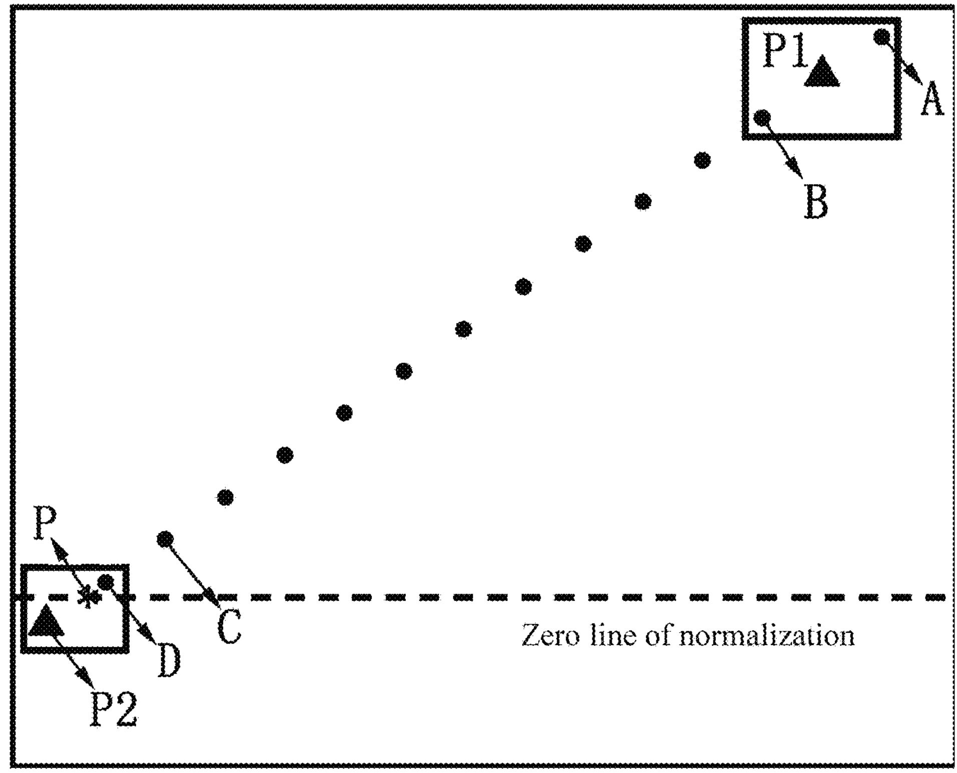

FIGS. 8*a* and 8*b* are exemplary schematic diagram illustrating time-of-flight measurements according to some embodiments of the present disclosure. FIG. 8*a* shows a case in which the value of point D is less than zero, and FIG. 8*b* shows a case in which the value of point D is greater than zero.

Referring to FIGS. 8*a* and 8*b*, time-of-flight measurements are performed based on the identified echo characteristic point. The data $l_{m-1}$, $h_D$, $h_C$, $h_{p-1}$, $l_m$, $h_p$ in the new data sequence Z correspond to the six points P2, D, C, B, P1, A, respectively, and point P is the determined echo characteristic point. A relative position of point P1 between points A and B is determined by interpolation calculations, and a time between point B and point P1 is calculated based on a sampling cycle of the preset reference echo signal $T_1$ using Equation (10):

$$T_1 = \left(\frac{l_m - h_{p-1}}{h_p - h_{p-1}}\right) * t_H \tag{10}$$

In Eq. (10), $t_H$ denotes the sampling cycle of the preset reference echo signal. Similarly, the sequence H is mapped to points between P1 and P2, and the value of a first mapping point (i.e., the point D) that is greater than P2 is identified, if the value of the point D is less than zero, as shown in FIG. 8*a*, a time $T_2$ between the echo characteristic point P and point C is obtained by interpolation calculations based on values of the two points C and D using Equation (11):

$$T_2 = \left(\frac{h_C}{h_C - h_D}\right) * t_H \tag{11}$$

As shown in FIG. 8*b*, if the value of the point D is greater than zero, a time $T_3$ between the echo characteristic point P and point D is obtained by interpolation calculations based on the values of the two points P2 and D using Equation (12):

$$T_3 = \left(\frac{h_D}{h_D - l_{m-1}}\right) * t_H \tag{12}$$

A time-of-flight t of the echo signal may be calculated using Equation (13):

$$t = \begin{cases} t_d + N * t_L - n_{BC} * t_H - T_1 - T_2, \ (h_D < 0, h_C > 0) \\ t_d + N * t_L - n_{BD} * t_H - T_1 - T_3, \ (h_D > 0, h_C > 0) \end{cases} \tag{13}$$

In Eq. (13), $t_d$ denotes a time from the excitation of the ultrasonic transducer to the beginning of the sampling of the echo signal, $t_L$ denotes a sampling cycle of a FPGA echo signal, N denotes an $N^{th}$ point of P1 in the sampling, $n_{BC}$ denotes a count of mapping points between B and C, and $n_{BD}$ denotes a count of mapping points between B and D.

It should be noted that the foregoing descriptions of operations S1 to S5 are provided for the purpose of exemplification and illustration, and do not limit the scope of application of the present disclosure. For a person skilled in the art, various corrections and changes may be made to operations S1 to S5 under the guidance of the present disclosure. However, these corrections and changes remain within the scope of the present disclosure.

To validate the validity and accuracy of the method for measuring a time-of-flight of an ultrasound echo signal provided in the present disclosure, a flow experiment was conducted to compare the method provided in the present embodiment and a conventional zero-crossing fitting method.

The experiment was conducted in accordance with the relevant requirements of the JJG1030-2007 "Calibration Regulation of Ultrasonic Flow Meters" at a room temperature of 25° C. and an atmospheric pressure of 101 kPa. Five flow points were selected for calibration: 1 $m^3$/h, 20 $m^3$/h, 40 $m^3$/h, 115 $m^3$/h, and 160 $m^3$/h, with each flow point tested three times. The experimental results are shown in Table 1 and Table 2:

TABLE 1

Flow rate calibration results of the method in the present disclosure

| Calibrated flow rate/ $m^3$/h | Measured flow rate/ $m^3$/h | Average error/(%) | Repeatability/ (%) |
|---|---|---|---|
| 1.047 | 1.059 | | |
| 1.046 | 1.057 | 1.115 | 0.055 |
| 1.047 | 1.059 | | |
| 19.737 | 19.734 | | |
| 19.736 | 19.728 | −0.029 | 0.013 |
| 19.737 | 19.731 | | |
| 39.747 | 39.683 | | |
| 39.755 | 39.692 | −0.157 | 0.005 |
| 39.759 | 39.699 | | |
| 115.186 | 114.564 | | |
| 115.311 | 114.695 | −0.528 | 0.015 |
| 115.233 | 114.644 | | |
| 159.74 | 158.883 | | |
| 159.657 | 158.716 | −0.553 | 0.032 |
| 159.775 | 158.925 | | |

TABLE 2

Flow rate calibration results of the conventional zero-crossing fitting method

| Calibrated flow rate/ $m^3$/h | Measured flow rate/ $m^3$/h | Average error/(%) | Repeatability/ (%) |
|---|---|---|---|
| 1.047 | 1.216 | | |
| 1.046 | 1.094 | 8.948 | 6.276 |
| 1.047 | 1.111 | | |
| 19.737 | 19.821 | | |
| 19.736 | 19.813 | 0.326 | 0.143 |
| 19.737 | 19.769 | | |
| 39.747 | 39.679 | | |
| 39.755 | 39.707 | −0.200 | 0.096 |
| 39.759 | 39.679 | | |
| 115.186 | 114.564 | | |
| 115.311 | 110.778 | −1.688 | 1.943 |
| 115.233 | 114.551 | | |
| 159.74 | 158.796 | | |
| 159.657 | 158.618 | −0.611 | 0.035 |
| 159.775 | 158.831 | | |

The experimental results show that the measurement error at a minimum flow point using the method provided in the present disclosure is only 1.115%, with repeatability below 0.2%. The errors at other flow points are all less than ±0.6%, with repeatability less than 0.035%, which is superior to the Grade 1 requirements in the "Calibration Regulation of Ultrasonic Flow Meters". Compared with the conventional zero-crossing fitting method, the method provided in the present disclosure reduces the impact of fitting on the measurement results, enhances the accuracy of echo characteristic point positioning, and improves the precision of the time-of-flight calculation, resulting in improvements in flow calibration error and repeatability, especially measurements at low flow rates.

In some embodiments of the present disclosure, the empirical wavelet transform is used to overcome a mode mixing problem in signal decomposition with low computational complexity. The empirical wavelet transform decomposes the echo signal into multiple decomposed components, which are correlated with the echo signal sequentially to remove the components with low correlation coefficients. The remaining useful components are then superimposed to obtain the reconstructed echo signal, thereby achieving noise reduction and reconstruction of the echo signal.

The characteristic peaks of the echo signal are accurately located by calculating the cosine distances of the preset reference echo signal and the reconstructed echo signal, and then the echo characteristic point is accurately localized by using the preset sampling information of the preset reference echo signal and the preset sampling information of the reconstructed echo signal. Since the sampling frequency of the preset reference echo signal is much higher than the sampling frequency of the reconstructed echo signal, the accuracy of echo characteristic point positioning is significantly enhanced.

Figure 9:
FIG. 9 is an exemplary schematic diagram illustrating the determination of a preset acquisition parameter according to some embodiments of the present disclosure.

FIG. 9 is an exemplary schematic diagram illustrating the determination of a preset acquisition parameter according to some embodiments of the present disclosure.

In some embodiments, as shown in FIG. 9, a controller (e.g., the controller 150) is further configured to: perform signal acquisition based on a first acquisition parameter and a second acquisition parameter, respectively, to obtain a first echo signal and a second echo signal; determine a first time-of-flight and a second time-of-flight based on the first echo signal and the second echo signal, respectively; and perform one or more rounds of preset iterations.

The first acquisition parameter and the second acquisition parameter are related parameters for acquiring echo signals. For example, each of the first acquisition parameter and the second acquisition parameter may include an acquisition frequency and an acquisition precision for acquiring the echo signal.

In some embodiments, the acquisition accuracy in the second acquisition parameter is greater than the acquisition accuracy in the first acquisition parameter, and the acquisition frequency in the second acquisition parameter is greater than the acquisition frequency in the first acquisition parameter.

The first echo signal and the second echo signal correspond to the echo signals acquired based on the first acquisition parameter and the second acquisition parameter, respectively.

The first time-of-flight and the second time-of-flight correspond to the time-of-flight of the first echo signal and the time-of-flight of the second echo signal, respectively.

In some embodiments, the controller may determine the first time-of-flight and the second time-of-flight based on the first echo signal and the second echo signal in a manner similar to operations S1 to S5.

The preset iteration is an iterative algorithm used to determine the preset acquisition parameter.

In some embodiments, the preset iteration may include: in response to a difference between the first time-of-flight and the second time-of-flight being greater than or equal to a first threshold, obtaining a third echo signal by adjusting the second acquisition parameter and performing signal acquisition based on an adjusted the second acquisition parameter; adjusting the first time-of-flight based on the second time-of-flight; adjusting the second time-of-flight based on the third echo signal; in response to the difference between the first time-of-flight and the second time-of-flight being less than the first threshold, ending the preset iteration and determining the second acquisition parameter as the preset acquisition parameter.

The first threshold refers to a threshold for determining whether to continue with the preset iteration. In some embodiments, the first threshold may be predetermined by a technician.

In some embodiments, the first threshold may also correlate to a material characteristic of a pipeline to be measured. For example, if a roughness of a pipe wall of the pipeline to be measured is relatively large, the ultrasonic signal may undergo more reflections and refractions, resulting in a relatively large noise, then the first threshold may be appropriately increased to avoid too many iterations. More descriptions of the material characteristic of the pipeline to be measured may be found in the corresponding description of the operation S221.

Exemplarily, in response to the difference between the first time-of-flight and the second time-of-flight being greater than or equal to the first threshold, the controller, after acquiring the third echo signal based on the adjusted second acquisition parameter, may take a current second time-of-flight as a new first time-of-flight, take the time-of-flight corresponding to the third echo signal as a new second time-of-flight, determine a difference between the new first time-of-flight and the new second time-of-flight, and determine whether to continue with the preset iteration based on the magnitude relationship between the difference and the first threshold value.

In some embodiments, in response to the difference between the first time-of-flight and the second time-of-flight being greater than or equal to the first threshold, the controller may adjust the second acquisition parameter and perform signal acquisition based on the adjusted second acquisition parameter to obtain the third echo signal. For example, in response to the difference between the first time-of-flight and the second time-of-flight being greater than or equal to the first threshold, the controller may increase the acquisition frequency and the acquisition accuracy in the second acquisition parameter by a corresponding preset adjustment amount, respectively, as the adjusted second acquisition parameter. Based on the adjusted second acquisition parameter, signal acquisition is conducted to obtain the third echo signal. The preset adjustment amount may be predetermined by a technician based on experience.

In some embodiments, the preset adjustment amount may be related to the difference between the first time-of-flight and the second time-of-flight at each preset iteration. For example, the larger the difference between the first time-of-flight and the second time-of-flight is, the larger the preset adjustment amount is.

In some embodiments of the present disclosure, by acquiring a plurality of echo signals, and performing one or more rounds of the preset iterations to determine the preset acquisition parameter based on the difference in the time-of-flight of the different echo signals, the preset acquisition parameter can be determined more reasonably, which can help to measure a more accurate time-of-flight of the echo signal.

In some embodiments, the controller is further configured to: adjust an emission parameter in response to a signal-to-noise ratio of the echo signal being lower than a second threshold, and re-control each of one or more ultrasonic transducers in a transmit mode to emit an ultrasonic signal based on an adjusted emission parameter. More descriptions of the emission parameter, the ultrasonic transducer, and the transmit mode may be found in FIG. 1 and the related descriptions thereof.

The second threshold refers to a threshold for determining whether or not to adjust the emission parameter. In some embodiments, the second threshold may be preset by a technician based on experience.

In some embodiments, the second threshold may be further correlated to a size of an inner diameter of the pipeline to be measured. For example, the smaller the size of the inner diameter of the pipeline to be measured, the greater the impact of an error in the determination of the time-of-flight, thus the second threshold may be set larger.

In some embodiments, the controller may adjust the emission parameters in a variety of ways. For example, the controller may reduce a vibration frequency of the ultrasonic transducer by a preset frequency adjustment amount to lower the frequency of the emitted ultrasonic signal until the signal-to-noise ratio of the echo signal is greater than the second threshold.

In some embodiments, the controller may re-control the ultrasonic transducer in the transmission mode to emit the ultrasonic signal based on the adjusted emission parameter and measure the time-of-flight of the echo signal by executing the operations S1 to S5.

In some embodiments of the present disclosure, by setting the second threshold and adjusting the emission parameter based on the relationship between the signal-to-noise ratio of the echo signal and the second threshold, the emission parameter of the ultrasonic transducer can be adjusted when the signal-to-noise ratio of the echo signal is high so that subsequent echo signals with low signal-to-noise ratios can be acquired for more precise calculations.

The basic concepts are described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements and corrections are suggested in present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This manner of disclosure does not, however, imply that the subject matters of the disclosure requires more features than are recited in the claims. Rather, claimed subject matters may lie in less than all features of a single foregoing disclosed embodiment.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for measuring a time-of-flight of an ultrasound echo signal, comprising:

S1: capturing an echo signal, including:

acquiring the echo signal transmitted by an ultrasonic transducer in a receive mode based on a preset acquisition parameter, wherein the preset acquisition parameter includes a preset frequency and a preset intensity of an ultrasonic wave;

adjusting an emission parameter in response to a signal-to-noise ratio of the echo signal being lower than a second threshold, including:

reducing a vibration frequency of the ultrasonic transducer by a preset frequency adjustment amount to lower a frequency of an ultrasonic signal emitted by the ultrasonic transducer; and re-controlling the ultrasonic transducer in a transmit mode to emit the ultrasonic signal based on the adjusted emission parameter until the signal-to-noise ratio of the echo signal is higher than the second threshold;

S2: obtaining a reconstructed echo signal by performing and reconstruction on the echo signal using an empirical wavelet transform;

S3: obtaining a preset reference echo signal, normalizing the preset reference echo signal to obtain a preset reference echo peak value, normalizing the reconstructed echo signal to obtain a reconstructed echo peak value, and determining an echo characteristic peak of the reconstructed echo signal using a preset characteristic peak positioning algorithm, wherein the operation S3 includes:

S31: obtaining the preset reference echo signal;

S32: normalizing the preset reference echo, and obtaining the preset reference echo peak value and the reconstructed echo peak value;

S33: obtaining a first echo peak value, a second echo peak value, and a third echo peak value of preset three consecutive cycles of the preset reference echo signal, and obtaining echo peak values of any three consecutive cycles of the reconstructed echo signal;

S34: performing cosine distance calculations between the echo peak values of the preset three consecutive cycles of the preset reference echo signal and the echo peak values of the any three consecutive cycles of the reconstructed echo signal;

S35: determining cosine distances between echo peak values of remaining three consecutive cycles of the reconstructed echo signal and the echo peak values of the preset three consecutive cycles of the preset reference echo signal, sorting the cosine distances by numerical magnitude, and identifying a portion of the reconstructed echo signal corresponding to three consecutive cycles corresponding to a maximum value of the cosine distances; and S36: obtaining a position of a preset echo characteristic peak of the preset reference echo signal in S33, and obtaining a position of an echo characteristic peak of the reconstructed echo signal corresponding to the maximum value of the cosine distances based on the position of the preset echo characteristic peak;

S4: obtaining high-frequency sampling points corresponding to the preset reference echo signal in S3, mapping the high-frequency sampling points to a preset region corresponding to the echo characteristic peak, obtaining a data sequence corresponding to the preset region, and obtaining an echo characteristic point corresponding to the data sequence by performing calculations on the data sequence using a preset interpolation algorithm, wherein the operation S4 includes:

S41: obtaining the high-frequency sampling points corresponding to the preset reference echo signal in S3;

S42: mapping the high-frequency sampling points to the preset region corresponding to the echo characteristic peak, and obtaining the data sequence corresponding to the preset region;

S43: obtaining a preset zero position of the data sequence corresponding to the preset region in S42; and S44: obtaining the echo characteristic point corresponding to the data sequence by performing calculations on a position before the preset zero position and a position after the preset zero position using the preset interpolation algorithm; and S5: measuring the time-of-flight of the echo signal based on the echo characteristic point using a preset measurement algorithm.

2. The method of claim 1, wherein the operation S2 further includes:

S21: obtaining a plurality of decomposition components by adaptively decomposing the echo signal using the empirical wavelet transform;

S22: obtaining useful components from the plurality of decomposition components using a preset extraction algorithm; and S23: superimposing the useful components to obtain the reconstructed echo signal.

3. The method of claim 2, wherein the operation S22 further includes:

S221: obtaining a count of maximum values and a count of preset values in the plurality of decomposition components in the operation S21, and determining boundary points, including:

determining the count of the preset values via a boundary point prediction model based on the count of the maximum values, a frequency of the echo signal and the signal-to-noise ratio of the echo signal, wherein the boundary point prediction model is a neural network model, the boundary point prediction model is obtained through training based on training samples with training labels, and the training includes:

obtaining a training dataset comprising a plurality of training samples and labels corresponding to each of the training samples, and performing one or more rounds of iterations, wherein each round of the one or more rounds of iterations includes:

selecting one or more training samples from the training dataset, inputting the one or more training samples into an initial boundary point prediction model to obtain a model prediction output corresponding to the one or more training samples; substituting the model prediction output and corresponding labels into a predefined loss function to calculate a value of the predefined loss function; and updating a model parameter of the initial boundary point prediction model in reverse based on the value of the predefined loss function, and ending the one or more rounds of iterations when an iteration process satisfies a preset condition to obtain a trained boundary point prediction model, wherein the preset condition includes the loss function converging or a count of the iterations reaching a threshold;

wherein a count of training samples for each sampling type in the training samples of the boundary point prediction model is greater than a preset count threshold, and the preset count threshold is positively correlated with a count of types of media in a pipeline to be measured;

S222: obtaining the reconstructed echo signal based on a detail coefficient $$W_f^e(n, t)$$

generated from an inner product between an empirical wavelet function $\psi_n(\omega)$ and the echo signal and an approximation coefficient $$W_f^e(0, t)$$

generated from an inner product between a scale function $\phi_n(\omega)$ and the echo signal;

S223: sequentially performing correlation calculations between the plurality of decomposition components and the echo signal in a preset order to determine a correlation between each of the plurality of decomposition components and the echo signal; and S224: in response to determining that correlations between decomposition components and the echo signal are greater than a preset threshold, determining the decomposition components corresponding to the correlations as the useful components.

4. The method of claim 3, wherein the empirical wavelet function $\psi_n(\omega)$ in the operation S222 is represented by the following equation:

$$\psi_n(\omega)=\begin{cases}1,\ \omega_n+t_n\le|\omega|\le\omega_{n+1}-t_{n+1}\\ \sin\left[\frac{\pi}{2}\beta\left(\frac{1}{2t_{n+1}}(|\omega|-\omega_{n+1}+t_{n+1})\right)\right],\\ \omega_{n+1}-t_{n+1}\le|\omega|\le\omega_{n+1}+t_{n+1}\\ \sin\left[\frac{\pi}{2}\beta\left(\frac{1}{2t_{n+1}}(|\omega|-\omega_n+t_n)\right)\right],\\ \omega_n-t_n\le|\omega|\le\omega_n+t_n\\ 0,\ \text{other}\end{cases}$$

the echo signal is decomposed into N consecutive intervals, denoted as $\Lambda_n=[\omega_{n-1}, \omega_n]$, n=1,2,3 . . . , N, wherein $\omega_n$ denotes the boundary points between the intervals, $\omega_0=0$, $\omega_n=\pi$.

5. The method of claim 4, wherein the scale function $\phi_n(\omega)$ in the operation S222 is represented by the following equation:

$$\phi_n(\omega)=\begin{cases}1,\ |\omega|\le\omega_n-t_n\\ \cos\left[\frac{\pi}{2}\beta\left(\frac{1}{2t_{n+1}}(|\omega|-\omega_{n+1}+t_{n+1})\right)\right],\\ \omega_n-t_n\le|\omega|\le\omega_n+t_n\\ 0,\ \text{other}\end{cases}$$

the echo signal is decomposed into N consecutive intervals, denoted as $\Lambda_n=[\omega_{n-1}, \omega_n]$, n=1,2,3 . . . , N, wherein $\omega_n$ denotes the boundary points between the intervals, $\omega_0=0$, $\omega_n=\pi$.

6. The method of claim 5, wherein the detail coefficient $$W_f^e(n, t)$$

generated from the inner product in the operation S222 is represented by the following equation:

$$W_f^e(n,t)=\langle f,\psi_n\rangle=\int f(\tau)\overline{\psi_n(\tau-t)}dt=F^{-1}\left[\int f(\omega)\overline{\psi_n(\omega)}\right]$$

the echo signal is decomposed into N consecutive intervals, denoted as $\Lambda_n=[\omega_{n-1}, \omega_n]$, n=1,2,3 . . . , N, wherein $\omega_n$ denotes the boundary points between the intervals, $\omega_0=0$, $\omega_n=\pi$, $\sqrt{\overline{\psi_n(\omega)}}$ denotes a complex conjugate of $\psi_n(\omega)$, and $F^{-1}[*]$ denotes an inverse Fourier transform.

7. The method of claim 6, wherein the approximation coefficient $$W_f^e(0, t)$$

in the operation S222 is represented by the following equation:

$$W_f^e(0,t)=\langle f,\phi_1\rangle=\int f(\tau)\overline{\phi_1(\tau-t)}dt=F^{-1}\left[\int f(\omega)\overline{\phi_1(\omega)}\right]$$

the echo signal is decomposed into N consecutive intervals, denoted as $\Lambda n=[\omega_{n-1}, \omega_n]$, n=1,2,3 . . . , N, wherein $\omega_n$ denotes the boundary points between the intervals, $\omega_0=0$, $\omega_n=\pi$, $\sqrt{\overline{\phi_1(\omega)}}$ denotes a complex conjugate of $\phi_n(\omega)$, and $F^{-1}[*]$ denotes the inverse Fourier transform.

8. The method of claim 1, further comprising:

performing first signal acquisition based on a first acquisition parameter and a second acquisition parameter, respectively, to obtain a first echo signal and a second echo signal;

determining a first time-of-flight and a second time-of-flight based on the first echo signal and the second echo signal, respectively; and performing one or more rounds of preset iterations; wherein the first acquisition parameter and the second acquisition parameter include an acquisition frequency and an acquisition precision for acquiring the echo signal, wherein each of the one or more rounds of preset iterations includes:

in response to a difference between the first time-of-flight and the second time-of-flight being greater than or equal to a first threshold, obtaining a third echo signal by adjusting the second acquisition parameter and performing second signal acquisition based on the adjusted second acquisition parameter, including:

increasing the acquisition frequency and the acquisition precision in the second acquisition parameter by corresponding preset adjustment amounts, respectively, as the adjusted second acquisition parameter, and performing third signal acquisition based on the adjusted second acquisition parameter to obtain the third echo signal;

adjusting the first time-of-flight based on the second time-of-flight;

adjusting the second time-of-flight based on the third echo signal; and in response to the difference between the first time-of-flight and the second time-of-flight being less than the first threshold, ending the one or more rounds of preset iterations, and determining the second acquisition parameter as the preset acquisition parameter.

9. The method of claim 8, wherein the acquisition precision in the second acquisition parameter is greater than the acquisition precision in the first acquisition parameter, and the acquisition frequency in the second acquisition parameter is greater than the acquisition frequency in the first acquisition parameter.

10. A system for measuring a time-of-flight of an ultrasound echo signal, comprising a signal generation unit, an ultrasonic transducer unit, a transmit/receive channel switching circuit, an echo acquisition unit, a controller, a communication interface, and a remote server, wherein: the signal generation unit is configured to generate an emission parameter for transmitting an ultrasonic wave; the ultrasonic transducer unit includes a plurality of ultrasonic transducers; the transmit/receive channel switching circuit is configured to switch the plurality of ultrasonic transducers into a transmit mode or a receive mode; the controller is communicatively connected to the echo acquisition unit and the signal generation unit; the controller is communicatively connected to the remote server via the communication interface; and the controller is configured to:

control each of one or more ultrasonic transducers in the transmit mode to emit an ultrasonic signal based on the emission parameter;

control the echo acquisition unit to acquire an echo signal transmitted by each of one or more ultrasonic transducers in the receive mode based on a preset acquisition parameter, including:

acquiring the echo signal transmitted by an ultrasonic transducer in a receive mode based on the preset acquisition parameter, wherein the preset acquisition parameter includes a preset frequency and a preset intensity of an ultrasonic wave;

adjusting the emission parameter in response to a signal-to-noise ratio of the echo signal being lower than a second threshold, including:

reducing a vibration frequency of the ultrasonic transducer by a preset frequency adjustment amount to lower a frequency of the ultrasonic signal emitted by the ultrasonic transducer; and re-controlling the ultrasonic transducer in a transmit mode to emit the ultrasonic signal based on the adjusted emission parameter until the signal-to-noise ratio of the echo signal is higher than the second threshold;

obtain a reconstructed echo signal by performing denoising and reconstruction on the echo signal using an empirical wavelet transform;

obtain a preset reference echo, normalize the preset reference echo signal to obtain a preset reference echo peak value, normalize the reconstructed echo signal to obtain a reconstructed echo peak value, and determine an echo characteristic peak of the reconstructed echo signal using a preset characteristic peak positioning algorithm, the preset reference echo and the preset characteristic peak positioning algorithm being pre-stored in the remote server;

obtain high-frequency sampling points corresponding to the preset reference echo, map the high-frequency sampling points to a preset region corresponding to the echo characteristic peak, obtain a data sequence corresponding to the preset region, and obtain an echo characteristic point corresponding to the data sequence by performing calculations on the data sequence using a preset interpolation algorithm, the preset interpolation algorithm being pre-stored in the remote server; and measure the time-of-flight of the echo signal based on the echo characteristic point using a preset measurement algorithm, the preset measurement algorithm being pre-stored in the remote server.

11. The system of claim 10, wherein the controller is further configured to:

perform first signal acquisition based on a first acquisition parameter and a second acquisition parameter, respectively, to obtain a first echo signal and a second echo signal;

determine a first time-of-flight and a second time-of-flight based on the first echo signal and the second echo signal, respectively;

perform one or more rounds of preset iterations, wherein to perform a round of iteration of the one or more rounds of preset iterations, the controller is further configured to:

in response to a difference between the first time-of-flight and the second time-of-flight being greater than or equal to a first threshold, obtain a third echo signal by adjusting the second acquisition parameter and performing second signal acquisition based on an adjusted second acquisition parameter, including:

increasing an acquisition frequency and an acquisition precision in the second acquisition parameter by corresponding preset adjustment amounts, respectively, as the adjusted second acquisition parameter, and performing third signal acquisition based on the adjusted second acquisition parameter to obtain the third echo signal;

adjust the first time-of-flight based on the second time-of-flight;

adjust the second time-of-flight based on the third echo signal; and in response to the difference between the first time-of-flight and the second time-of-flight being less than the first threshold, end the preset iteration and determine the second acquisition parameter as the preset acquisition parameter.

* * * * *